Dec. 21, 1965 W. S. FIEDLER ETAL 3,224,846
LIGHT WEIGHT STRUCTURAL MATERIAL AND MEANS FOR MAKING
Filed Sept. 24, 1962
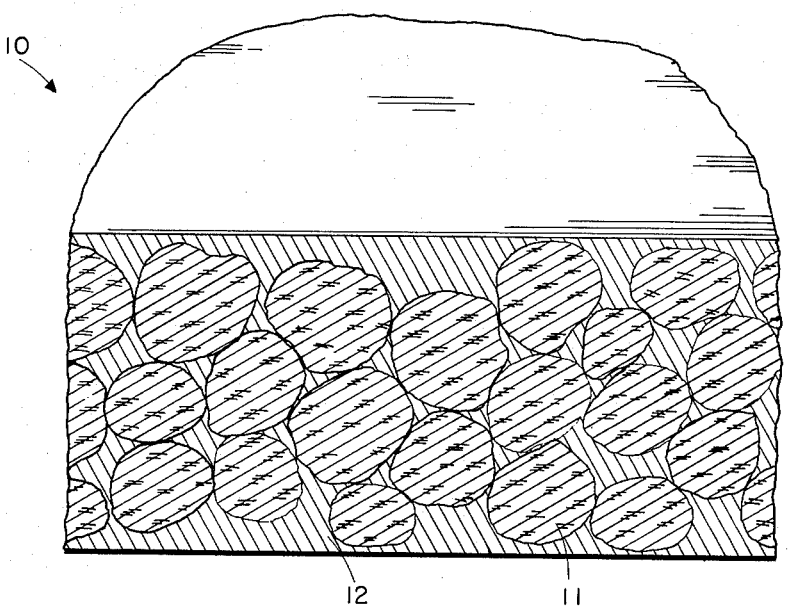
INVENTOR.
JOHN M. DIEHL
BY WILLIAM S. FIEDLER
ATTORNEY United States Patent Office 3,224,846
Patented Dec. 21, 1965

3,224,846
LIGHT WEIGHT STRUCTURAL MATERIAL
AND MEANS FOR MAKING
William S. Fiedler and John M. Diehl, Madison, Wis., assignors to LOR Corporation, Enid, Okla., a corporation of Delaware
Filed Sept. 24, 1962, Ser. No. 225,746
3 Claims. (Cl. 29—183.5)

This invention relates to a method for providing a light weight cellular metal structural material similar to that described as foamed metal in United States Patent 2,751,289 to John C. Elliott, and in United States Patent 2,434,775 to Benjamin Sosnick. Metal foam has been previously produced by introducing gas or finely divided thermally decomposable or volatile fluid or solid material into a molten metal. Gas or vapor evolved by the volatilization or decomposition of the volatile or decomposable material causes the molten metal to expand and foam. The material is cooled to provide solidified cellular metal foam in which gas or vapor is entrained.

Similar material comprising metal incorporating light weight aggregate has been disclosed using particles of either hollow or solid high melting inorganic material such as glass, vitreous silica, etc. dispersed in a metal matrix to provide an inexpensive structural material.

The process of this invention provides a material similar to the above materials wherein cells are provided in a metal matrix by adding to a vessel containing the hot fluid metal, material such as particulate cork, bark, grass, corn stalks, husks or cobs, paper, or other natural fibrous or cellulosic materials. The temperature of the molten metal, which may comprise low melting aluminum-magnesium eutectic melting at approximately 463° C., lead alloys or the like, zinc, tin, copper, iron, etc. and alloys thereof causes cellulosic materials and other organic materials such as natural or synthetic resins to be destructively distilled or decomposed to produce gaseous discharges and at least carbonized residue in the fluid mass. The viscous mass entrains the gas so formed and is thereby foamed in the manner of whipped cream or of leavened loaf. The carbonized surface layer residue of the admixed particles may partially either alloy or mix with the metal matrix, but substantially fills the cellular voids in the metal.

It is an object of this invention to provide a method for producing light weight cellular structural material.

It is another object of this invention to provide an inexpensive means for foaming of metal.

It is another object of this invention to utilize material for foaming metal which causes the metal to expand both from outgasing of the added material and decomposition and destructive distillation or decomposition of the material.

It is another object of the invention to provide naturally occurring organic material as a foaming agent for providing foamed metal.

Other objects will become apparent from the drawings and from the following detailed description in which it is intended to illustrate the applicability of the invention without thereby limiting its scope to less than that of all equivalents which will be apparent to one skilled in the art. In the drawings like reference numerals refer to like parts, and The figure is a perspective view in section of material of this invention.

In the figure article 10 comprises aggregate 11 of cellulosic or fibrous composition, such as cork or pieces of wood, dispersed throughout solid state metal matrix 12. Article 10 may be provided by the method hereinafter described wherein molten metal and a material such as vegetation comprising cellulosic fiber, manufactured sheet material comprising cellulosic fiber, animal refuse and natural, synthetic or artificial resins.

In the process of this invention a molten or fluid metal or alloy such as an aluminum magnesium alloy is heated to fluid state temperature between the solidus and liquidus temperatures of the alloy or to a temperature above the liquidus temperature in a substantially closed vessel under an inert atmosphere of nitrogen, helium, carbon dioxide combustion product gas or other inert gas or non-reactive vapor or oxygen deleted atmosphere. Comminuted material consisting of wood or a wood product selected from cork, balsa, spruce, pine, oak, mahogany, or similar wood, or from other cellulosic material such as grasses, vegetation, corn stalks, corn cobs, straw, grass or the like, or two or more of such products used conjointly either partially destructively distilled prior to use to expand the material such as in the case of cork which may be so treated to expand the material and decrease the density thereof or to remove the most volatile constituents therefrom. The molen metal such as lead, aluminum, steel or the like is introduced into the interstices of the loose cellulosic aggregate material under essentially inert atmosphere so that only the surface layer of each discrete piece of aggregate may be decomposed before the metal cools. The aggregate material will burn or oxidize only slightly or not at all due to the inert atmosphere. Further, when gaseous decomposition products are produced by decomposition of material, the gases provide a layer surrounding and partially enclosing the discrete particle of material of which the gas is used, thereby insulating the particle from the hote molten or fluid metal, as does the decomposed layer on the surface of each particle, and aids in preventing further decomposition of the material.

As well as wood products and grasses or the like other organic materials may be used for aggregate in the same manner such as natural or synthetic resin, dried peas, beans, and vines thereof, other dried vegetables, weeds or stems thereof, bone chips, dried animal refuse or other comparable material.

The following examples serve to further illustrate the invention:

*Example 1*

An alloy consisting of 6.75% magnesium, 0.015% beryllium, and the balance aluminum is heated to 650° C. in a closed furnace. The air from the interior of the furnace is purged with combustion gases to provide an essentially inert atmosphere within the furnace. Cork granulated to a size to provide particles from ½-inch diameter to about ¹⁄₃₂-inch diameter but not less than 2000 microns size is introduced into the molten metal within the furnace and dispersed therein for 3 or 4 seconds by means of a portable mixer. The mixer is operated until the cork particles were substantially uniformly dispersed through the molten metal in the furnace. The cork and the mixer shaft are introduced in the furnace through a discharge opening in the furnace into which a gas torch flame is directed, both for the purpose of heating the discharge opening to prevent metal from solidifying therein when the contents of the furnace are poured from the furnace and also to provide a positive pressure of combustion gases within the furnace to prevent oxygen from entering the furnace. After mixing of the cork into the molten metal, the mixer was withdrawn and the furnace tipped to pour the metal through the discharge outlet into a mold. Upon pouring of the molten metal during the initial stage of expansion, the mixture continues to expand after being poured in the mold. The mold is a sand preheated to a temperature of 500° C. The cast metal expands within the mold until a density of approximately 25 pounds per cubic foot is obtained. The foaming of the metal occurs from gas generated by decomposition of the surface layer of the particles of cork introduced into the furnace; the cork particles although not heated to decomposition temperature throughout, substantially fill the pores in the molten mass.

*Example 2*

An asbestos mold is filled with birch wood particles which pass through a ½″ mesh screen but not through a ¼″ mesh screen. They are loosely placed in the mold to provide a pervious layer in the mold. Engine exhaust gases are introduced into the bottom of the mold and are passed through the wood pieces until the wood is heated to a temperature of approximately 200° to 300° F. The mold is closed except for an exhaust gas vent and fill opening in the upper opening of the mold. A molten zinc-lead alloy comprising 50% lead and 50% zinc by weight is then poured into the mold and fills the interstices in the layer of wood within the mold. Substantially no expansion takes place. A metal product comprising wood aggregate is obtained having a density of about 360 pounds per cubic foot. The material is suitable for use within a building structure such as for a wall of a building.

*Example 3*

300 pounds of white pine blocks which pass a 1″ screen but not through a ¼″ mesh screen is kiln dried for 45 minutes at approximately 300° F. by cycling hot exhaust gas in the kiln. 600 pounds of molten pig iron is charged to the kiln. The kiln is rotated at about 80 r.p.m. for 10 seconds to thoroughly mix the ingredients of the kiln, whereupon the kiln is emptied by a tap being opened at the bottom of the kiln and the material therein being discharged into a mold by gravity flow. The material is allowed to harden into a flat plate having a density of approximately 300 pounds per cubic foot. The plate may be used to provide temporary roadways across wet fields and swamps to enable tractors and other vehicles to traverse such areas.

Straw, bark, bone chips and the like may be used in similar manner with molten metals, or with alloys which are heated to above solidus temperature or above liquidus temperature to provide a partially gas expanded partially aggregate filled structural material of this invention.

As metals, aluminum and aluminum alloys are preferred.

Not all of the oxygen need by excluded in all cases from the receptacle in which the molten metal and aggregate are mixed because the metal excludes oxygen to some extent from the pieces of aggregate embedded therein.

The invention applies both to those embodiments in which much gas is generated by the aggregate during mixing and to those embodiments in which little or even substantially no gas is so generated and substantially no expansion of the metal takes place.

It is preferred that the aggregate particles all be retained by a screen having a ⅛″ mesh. Particles which pass through a 10-mesh screen are of doubtful utility and are not preferred.

While certain modifications and embodiments of the invention have been described, it is of course to be understood that there are a great number of variations which will suggest themselves to anyone familiar with the subject matter thereof and it is to be distinctly understood that this invention should not be limited except by such limitations as are clearly imposed in the appended claims.

We claim:

1. Light weight structural material comprising in combination a continuous phase solid state metal matrix, a multitude of cells within said metal matrix wherein each cell contains at least one discrete piece of aggregate, said piece being at least partially carbonized residue of organic material wherein said cells are predominantly discrete and non-communicating and wherein each of said discrete pieces of aggregate has an original size of at least one-eighth inch.

2. The process of providing a light weight structural material comprising the steps of providing a mold, charging to said mold a mixture of molten metal and at least one particulate organic material of a particle size of at least one-eighth inch selected from the group consisting of components of trees, plant stalks, corn cobs, cellulosic fibrous pieces, organic animal refuse, material manufactured from cellulosic fiber, organic polymeric material, cooling said charge in said mold to solidify said molten metal thereby to provide light weight structural material.

3. The process of claim 2 wherein said material is wood.

References Cited by the Examiner

UNITED STATES PATENTS

| | | | |
|---|---|---|---|
| 2,394,993 | 12/1946 | Gardner | 106—122 |
| 2,917,384 | 12/1959 | Grandey | 106—122 |
| 3,049,799 | 8/1962 | Breining et al. | |
| 3,055,763 | 9/1962 | Kreigh et al. | 29—180 |

FOREIGN PATENTS 1,132,731   7/1962   Germany.

MARCUS U. LYONS, *Primary Examiner.*

MICHAEL V. BRINDISI, *Examiner.*